(12) United States Patent
Fein et al.

(10) Patent No.: US 8,378,932 B2
(45) Date of Patent: Feb. 19, 2013

(54) FOLDABLE PORTABLE DISPLAY

(75) Inventors: Gene Fein, Malibu, CA (US); Edward Merritt, Lenox, MA (US)

(73) Assignee: Empire Technology Development, LLC, Wilmington, DE (US)

( * ) Notice: Subject to any disclaimer, the term of this patent is extended or adjusted under 35 U.S.C. 154(b) by 716 days.

(21) Appl. No.: 12/463,969

(22) Filed: May 11, 2009

(65) Prior Publication Data

US 2010/0283713 A1 Nov. 11, 2010

(51) Int. Cl.
*G09G 3/30* (2006.01)
(52) U.S. Cl. .............................. 345/76; 345/30; 362/362
(58) Field of Classification Search .................. None
See application file for complete search history.

(56) References Cited

U.S. PATENT DOCUMENTS

| | | | | |
|---|---|---|---|---|
| 5,128,662 A * | 7/1992 | Failla | ............................ | 345/1.3 |
| 5,173,686 A * | 12/1992 | Fujihara | ........................ | 345/87 |
| 5,467,106 A * | 11/1995 | Salomon | ........................ | 345/87 |
| 5,589,849 A * | 12/1996 | Ditzik | ...................... | 361/679.22 |
| 5,796,374 A * | 8/1998 | Cone et al. | ......................... | 345/8 |
| 6,016,176 A * | 1/2000 | Kim et al. | ........................ | 349/84 |
| 6,229,514 B1 * | 5/2001 | Larson | ........................... | 345/101 |
| 6,302,612 B1 * | 10/2001 | Fowler et al. | ................... | 403/76 |
| 6,327,482 B1 * | 12/2001 | Miyashita | ...................... | 455/566 |
| 6,643,124 B1 * | 11/2003 | Wilk | ........................ | 361/679.04 |
| 6,753,788 B1 * | 6/2004 | Munyon | ...................... | 340/815.4 |
| 6,819,304 B2 * | 11/2004 | Branson | ........................ | 345/1.3 |
| 6,919,864 B1 * | 7/2005 | Macor | ............................ | 345/1.1 |
| 6,931,265 B2 * | 8/2005 | Reyes et al. | .................... | 455/566 |
| 6,970,210 B2 * | 11/2005 | Kim et al. | ....................... | 349/58 |
| 6,972,751 B2 * | 12/2005 | Sadahiro | ........................ | 345/173 |
| 7,050,835 B2 * | 5/2006 | Hack et al. | .................... | 455/566 |
| 7,230,599 B2 * | 6/2007 | Wu et al. | ......................... | 345/87 |
| D609,203 S * | 2/2010 | Birsel et al. | ............. | D14/138 R |
| 7,665,709 B2 * | 2/2010 | Cvek | ............................ | 248/669 |
| 7,667,962 B2 * | 2/2010 | Mullen | .................... | 361/679.56 |
| 7,692,667 B2 * | 4/2010 | Nguyen et al. | ................ | 345/619 |
| 7,830,107 B2 * | 11/2010 | Inoue et al. | .................... | 318/470 |
| 7,830,333 B2 * | 11/2010 | Aoki | .............................. | 345/1.3 |
| D630,607 S * | 1/2011 | Li | .......................... | D14/138 AB |
| 7,880,724 B2 * | 2/2011 | Nguyen et al. | ................ | 345/168 |
| 7,953,462 B2 * | 5/2011 | Harry | .......................... | 455/575.1 |
| 8,064,962 B2 * | 11/2011 | Wilcox et al. | ................. | 455/566 |
| 2003/0050019 A1 | 3/2003 | Dowling et al. | | |
| 2006/0082518 A1 * | 4/2006 | Ram | .............................. | 345/1.1 |
| 2007/0211036 A1 * | 9/2007 | Perkins | ......................... | 345/173 |
| 2007/0285341 A1 * | 12/2007 | Manning | ....................... | 345/1.3 |
| 2007/0285343 A1 * | 12/2007 | Han et al. | ........................ | 345/1.3 |
| 2011/0018820 A1 * | 1/2011 | Huitema et al. | .............. | 345/173 |

* cited by examiner

Primary Examiner — Alexander Eisen
Assistant Examiner — Sanjiv D Patel
(74) Attorney, Agent, or Firm — Steven S. Rubin, Esq.; Moritt Hock & Hamroff LLP

(57) ABSTRACT

Techniques are generally described for a system, method and apparatus that provides a foldable portable display, such as may be used in conjunction with a handheld or other portable electronic device. The display screen may be folded and/or retracted into a smaller form factor for easy concealment and/or stowage. When in use, the display may be extended into a larger size and shape than the case for the device.

22 Claims, 14 Drawing Sheets

FOLDABLE PORTABLE DISPLAY

BACKGROUND INFORMATION

The rapid miniaturization of computers and components has led to the development of very small but powerful portable devices. Many people now carry around small, handheld devices that function as a telephone, a calendar, a contacts organizer, an e-mail client, a web browser, a word processor, and even a spreadsheet editor. Frequently, such devices are constructed using relatively small displays.

BRIEF DESCRIPTION OF THE DRAWINGS

This disclosure describes only certain embodiments, the features of which will become apparent from the following description, in conjunction with the accompanying drawings, and the appended claims. The drawings depict only certain embodiments and are, therefore, not to be considered limiting of the scope of the claims. The disclosure will be described with additional specificity and detail through use of the accompanying drawings. In the drawings:

DETAILED DESCRIPTION OF ILLUSTRATIVE EMBODIMENTS

Figure 1:
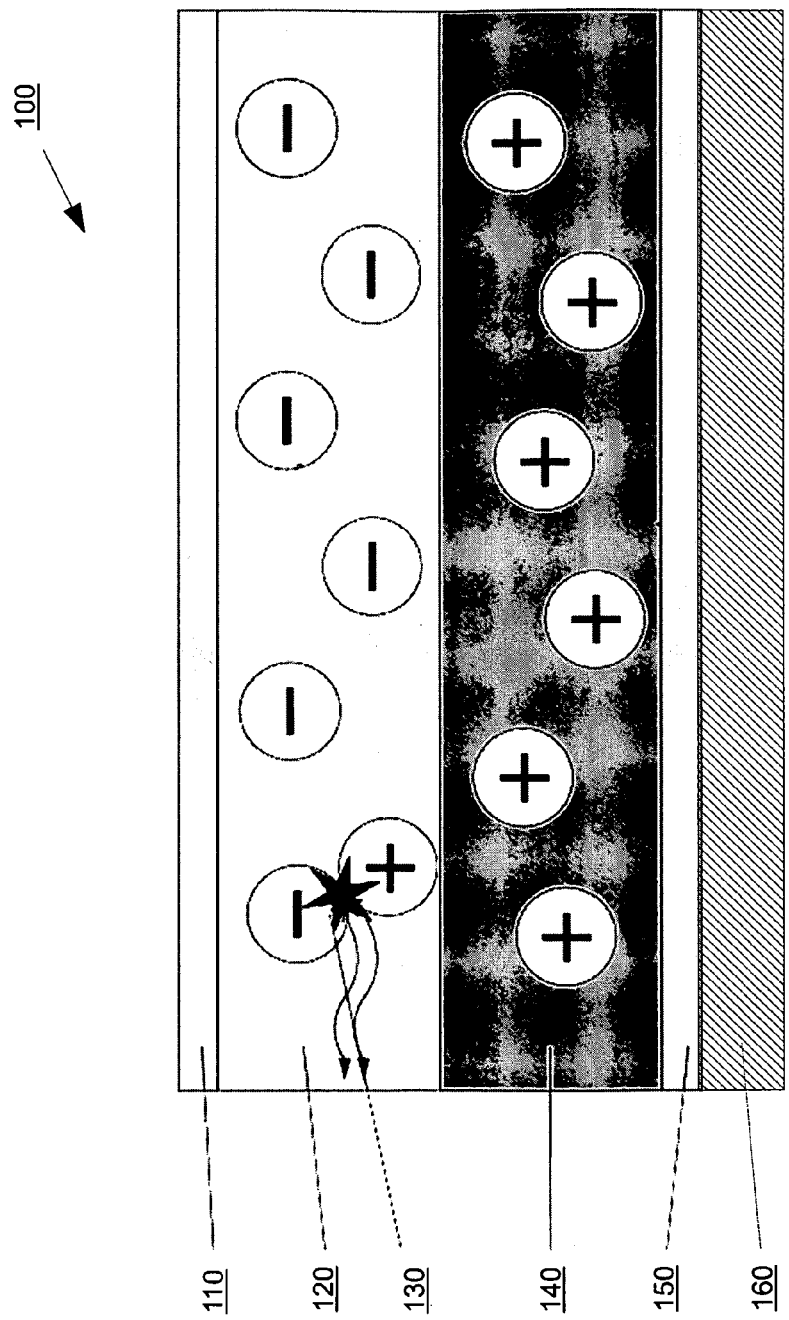
FIG. 1 is a functional block diagram of a two-layer organic light emitting diode that may be used in certain embodiments.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be used, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs and systems related to display systems. Certain embodiments of one such system are illustrated in the figures and described below. Many other embodiments are also possible, however, time and space limitations prevent including an exhaustive list of those embodiments in one document. Accordingly, other embodiments within the scope of the claims will become apparent to those skilled in the art from the teachings of this disclosure.

A system is described that provides a foldable portable display, such as may be used in conjunction with a handheld electronic device. Briefly described, some embodiments illustrate a display screen that may be folded and/or retracted into a smaller form factor for easy concealment and/or stowage. When in use, the display may be extended into a fully usable size and shape. In this way, small portable devices may be carried around easily, yet still include a reasonable sized display screen.

FIG. 1 is a functional block diagram of a two-layer organic light emitting diode (OLED) that may be used in certain embodiments, in accordance with the present disclosure. As described below, multilayer OLEDs may also be used in other embodiments.

An OLED (which may also be referred to as a "light emitting polymer" and an "organic electro luminescence device") may be any light emitting diode (LED) whose emissive electroluminescent layer is composed of a film of organic compounds. The layer may contain a polymer substance upon which suitable organic compounds may be deposited. The OLEDs may be deposited in rows and columns onto a flat carrier by a simple "printing" process. The resulting matrix of pixels may emit light of different colors.

Such systems may be used in television screens and computer displays. Such systems may be also used in small, portable system screens such as cell phones and PDAs, which can be used for purposes such as advertising, news dissemination, and navigation. OLEDs may also be used as light sources for general space illumination in the form of large-area light-emitting elements. OLEDs may emit less light per area than inorganic solid-state based LEDs, which are commonly used as point-light sources.

OLED displays do not require a backlight to function. Thus OLED displays may draw less power than backlight displays. When (for example) powered from a battery, OLED displays may operate longer than comparably-sized liquid crystal displays (LCDs). When no backlight is used, an OLED display can be much thinner than an LCD panel.

A typical OLED may include emissive layer 120, conductive layer 140, substrate 160, and anode 150 and cathode 110 terminals. The layers may be made of special organic molecules and/or polymers that may conduct electricity. The levels of conductivity of the organic molecules used in OLEDs may range from those of insulators to those of conductors, and may be called "organic semiconductors."

Multilayer OLEDs may have more than two layers to improve device efficiency. In addition to the conductive properties of the layers, the layers may be chosen to aid charge injection at electrodes by providing a more gradual electronic profile, or block a charge from reaching the opposite electrode and being wasted.

A voltage may typically be applied across OLED 100 such that anode 150 is positive with respect to cathode 110. The applied voltage may cause a current of electrons to flow through the device from cathode 110 to anode 150. Thus, cathode 110 may donate free electrons to emissive layer 120 while anode 150 may withdraw free electrons from conductive layer 140. In other words, anode 150 may donate "holes" to the conductive layer 140.

When emissive layer 120 becomes negatively charged, conductive layer 140 may become rich in positively charged holes. Electrostatic forces may bring the electrons and the holes towards each other where they recombine, as in recombination 130. Recombination 130 may happen closer to emissive layer 120, because in organic semiconductors holes are typically more mobile than electrons (as compared to electron mobility in inorganic semiconductors). Recombination 130 may cause a drop in the energy levels of electrons, which may be accompanied by a concomitant emission of radiation having frequencies in the visible region. Thus the layer may be called an "emissive" layer.

OLED 100 does not normally emit light when the anode 150 is lowered to a negative potential with respect to cathode 110. In such a forward-biased condition, holes tend to move to the anode and electrons to the cathode (and away from each other), which tends to discourage recombination.

Indium tin oxide may be used as anode 150 material. Indium tin oxide may be transparent to visible light and have a high work function, which may promote injection of holes into the polymer layer of the anode 150. Metals such as aluminum and calcium may be used for cathode 110 as they may have low work function, which may promote injection of electrons into the polymer layer of cathode 110.

In similar fashion to LCDs being arranged in passive-matrix and active-matrix LCDs, OLEDs may also be categorized into passive-matrix and active-matrix displays. Active-matrix OLEDs (AMOLEDs) may use a thin film transistor backplane to switch the individual pixel on or off, and thus can make higher resolution and larger size displays possible as compared with using passive matrix OLEDs.

Figure 2:
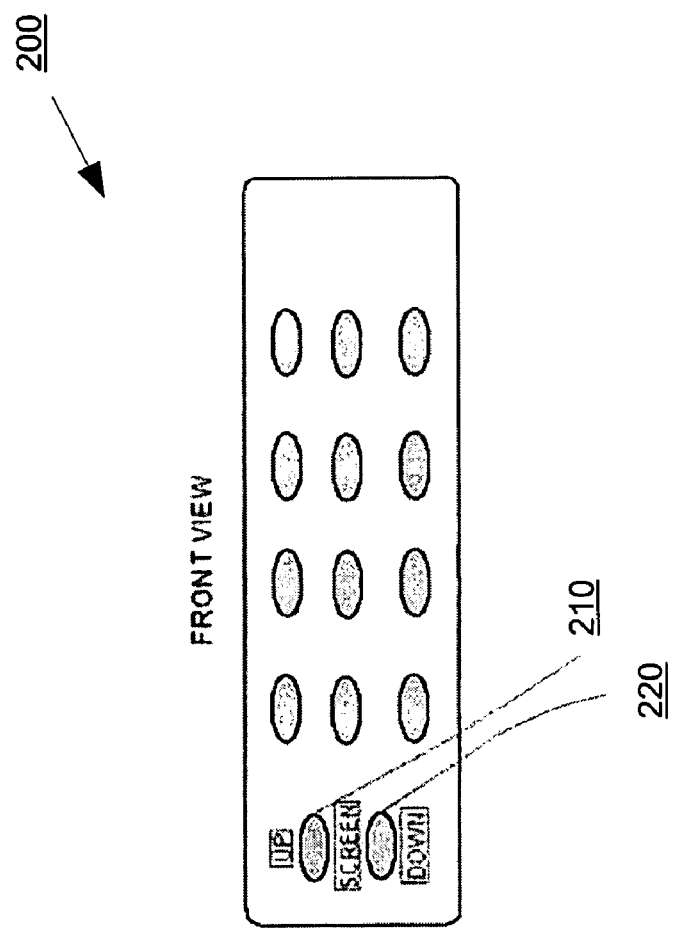
FIG. 2 is a front view of some embodiments of a foldable portable display.

FIG. 2 is a front view of some embodiments of a foldable portable display (FPD), arranged in accordance with the present disclosure. FPD 200 may include a front face that may include buttons. The buttons may be implemented using user-actuated buttons. The buttons may be physical keys and/or virtual keys (such as those provided by a touch-sensitive display). Other user interface controls (such as voice recognition) may be used to implement the functionality provided by the keys. Feedback may be provided using light, vibration, and/or a speaker. Accordingly, FPD 200 may be used as a multimedia recorder and/or player.

Up-button 210 may be actuated (e.g., depressed and released) to control an extendible OLED screen (shown below with respect to FIG. 5, for example) that may extend upwards from the case of the FPD 200. The OLED screen may be arranged in, for example, a foldable or telescoping frame work. Down-button 220 may be actuated to control the retraction of the extendible OLED screen into the case of the FPD 200. Thus, the extendible OLED screen can be extended and retracted across a percentage of a ranges (extending from fully-extended to fully-retracted) using up-button 210 and down-button 220.

Figure 3:
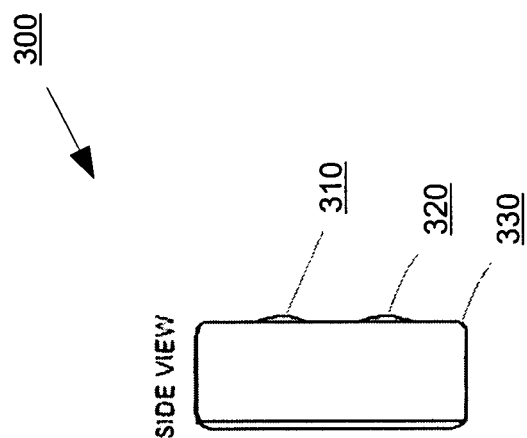
FIG. 3 is a side view of the foldable portable display illustrated in FIG. 2.

FIG. 3 is a side view of the foldable portable display illustrated in FIG. 2, arranged in accordance with the present disclosure. In some embodiments, FPD 300 may include an up-button 310 and a down-button 320 that extend outwards from the front face of FPD 300. The case 330 of FPD 300 may be deep enough to include internal electronics, as well as a portable power supply such as a battery.

Figure 4:
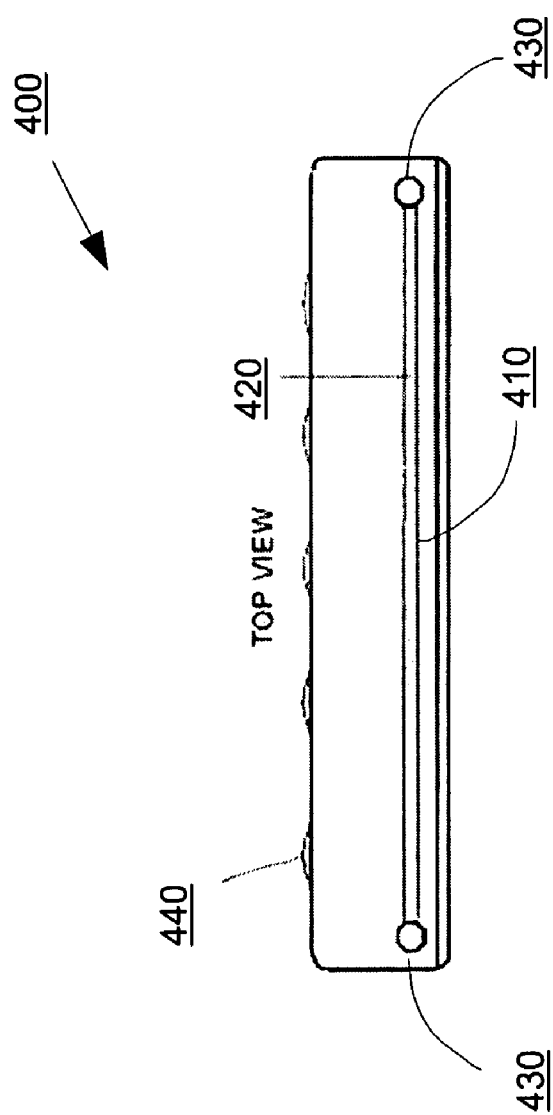
FIG. 4 is a top view of the foldable portable display illustrated in FIG. 2.

FIG. 4 is a top view of the foldable portable display illustrated in FIG. 2, arranged in accordance with the present disclosure. In some embodiments, FPD 400 may include buttons 440 that extend outwards from the front face of FPD 400. The top of FPD may contain slot 410 from which the concealed OLED can be extended. Slot 410 can have sliding portal 420 that may automatically seal the compartment (520, discussed below) of the FPD in which the OLED is stored when fully retracted. Orifices 430 may be used to provide an opening through which edges of a frame supporting the extendible OLED screen may extend. The edges of the frame may be arranged to seal the orifices when the extendible OLED screen is fully retracted. Sliding portal 420 may be used seal orifices 430.

Figure 5:
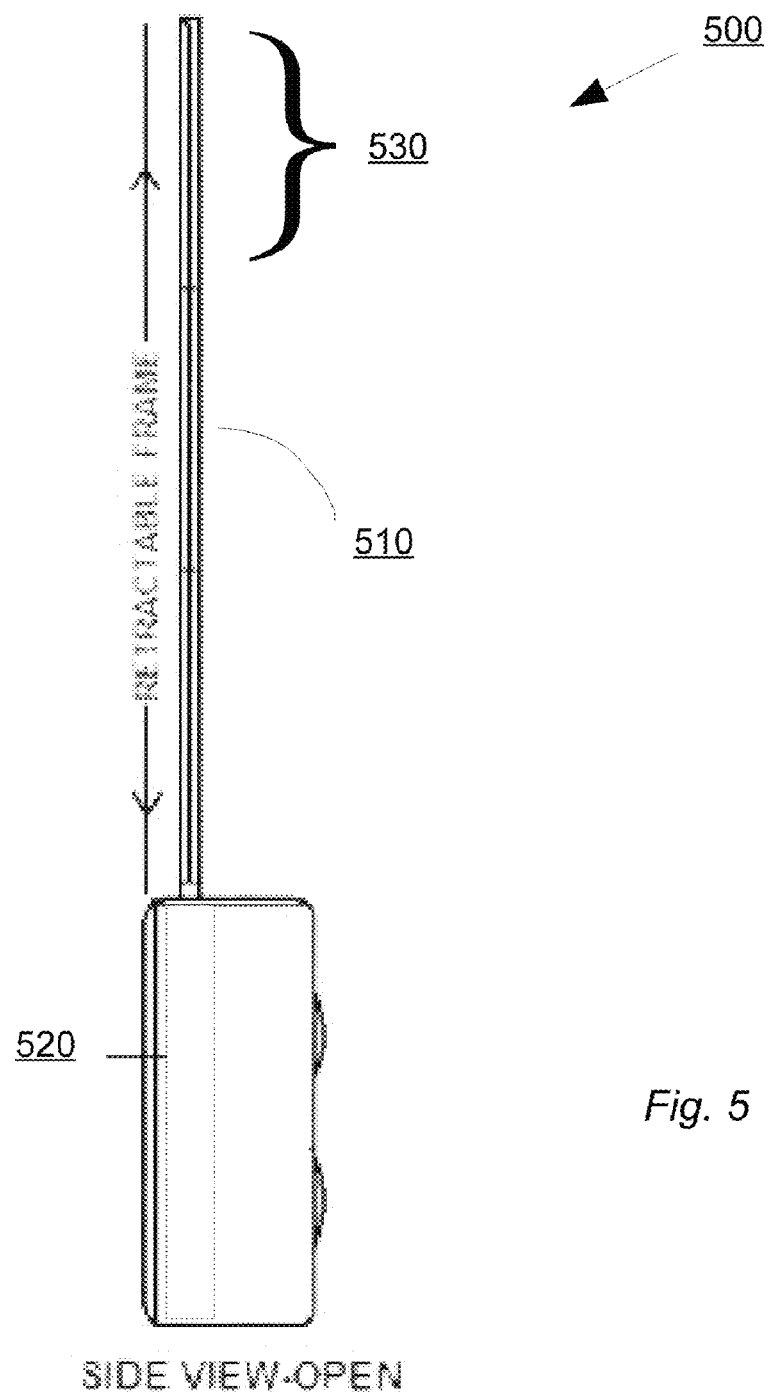
FIG. 5 is a side view of the foldable portable display illustrated in FIG. 2 in the opened position.

FIG. 5 is a side view of the foldable portable display illustrated in FIG. 2 in the opened position, arranged in accordance with the present disclosure. FPD 500 is illustrated showing OLED screen 510 in an extended position. In some embodiments, FPD 500 may include a compartment 520 that is arranged to store OLED screen 510 when the screen is in a retracted position. OLED screen 510 may include vertical rails 530 (one is illustrated is the side view) that may be arranged to fold (and/or slide) so that OLED screen 510 may be stored using the relative safety provided by compartment 520. As will be discussed below in FIG. 6, the OLEDs may be formed in a flexible, continuous layer that may extend across the front face of the FPD 500.

Figure 6:
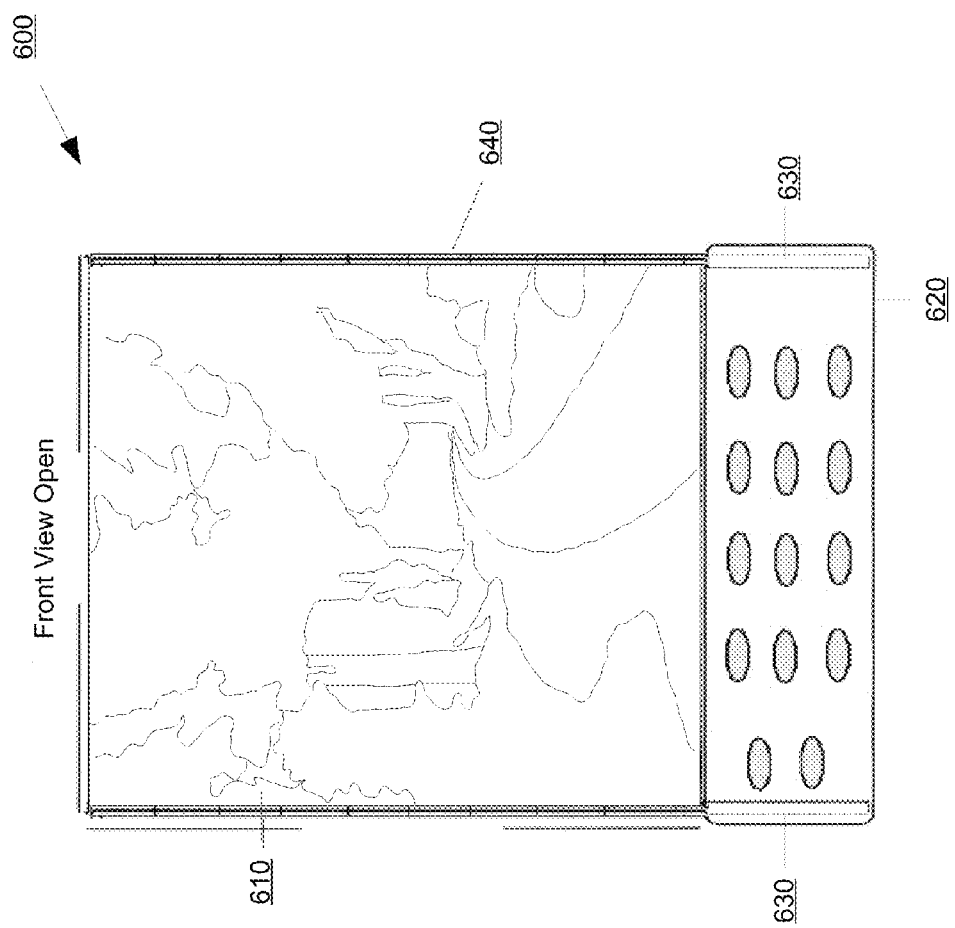
FIG. 6 is a front view of the foldable portable display illustrated in FIG. 2 in the opened position.

FIG. 6 is a front view of the foldable portable display illustrated in FIG. 2 in the opened position, arranged in accordance with the present disclosure. OLED screen 610 is shown as being fully extended from case 620 of FPD 600. In some embodiments OLED screen 610 may include a foldable sheet of plastic OLEDs formed on a substrate (such as shown in FIG. 1). As illustrated in FIG. 6, the OLEDs may be formed as a matrix of solid state semiconductors such that an image may be displayed on OLED screen 610. The substrate can be formed using highly flexible plastics and/or metallic foils.

As illustrated, case 620 has a width in this example of over six inches, while OLED screen 610 has a width of six inches. The dimensions allow OLED screen 160 to be stored inside case 620 without having to be folded about a vertical axis. OLED screen 160 can be extended upwards (e.g., in a vertical direction) by extracting the folded or rolled substrate containing the OLEDs. OLED screen 160 may be extended for a distance (which is illustrated as being over six inches) that is greater than the height of case 620 (which is illustrated as being under two inches). Case 620 may be arranged to provide compartments 630 in which segments of a frame 640 for supporting the extendible OLED screen may be stored when retracted.

Figure 7:
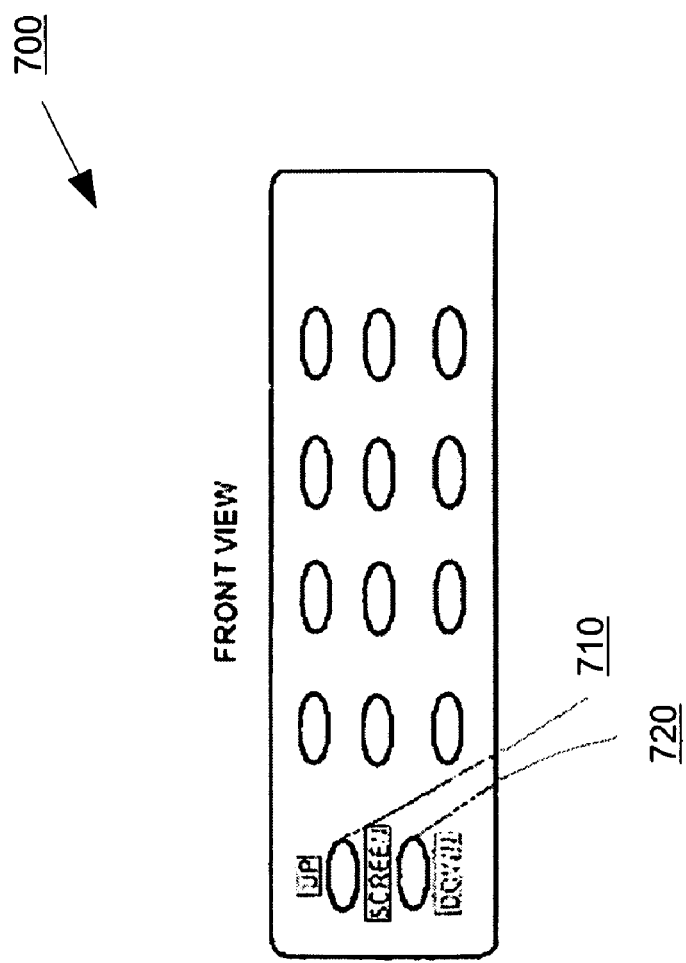
FIG. 7 is a front view of another embodiment of a foldable portable display.

FIG. 7 is a front view of another embodiment of a foldable portable display, arranged in accordance with the present disclosure. In some embodiments, FPD 700 may include a front face that may include buttons. Up-button 710 may be actuated to control the extension of an extendible OLED screen (shown below with respect to FIG. 11, for example) that may be arranged extend upwards and outwards from the case of the FPD 700. Down-button 720 may be actuated to control the retraction of the extendible OLED screen into the case of the FPD 700. Thus, the extendible OLED screen may be extended and retracted throughout a range extending from fully-extended to fully-retracted by using up-button 710 and down-button 720.

Figure 8:
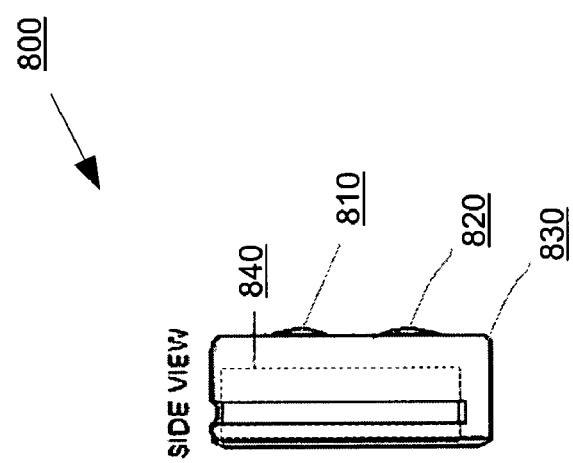
FIG. 8 is a side view of the foldable portable display illustrated in FIG. 7.

FIG. 8 is a side view of the foldable portable display illustrated in FIG. 7, arranged in accordance with the present disclosure. In some embodiments, FPD 800 may include up-button 810 and down-button 820 that may extend outwards from the front face of FPD 800. The case 830 of FPD 800 may include compartment 840, which may be arranged to receive and store the OLED screen.

Figure 9:
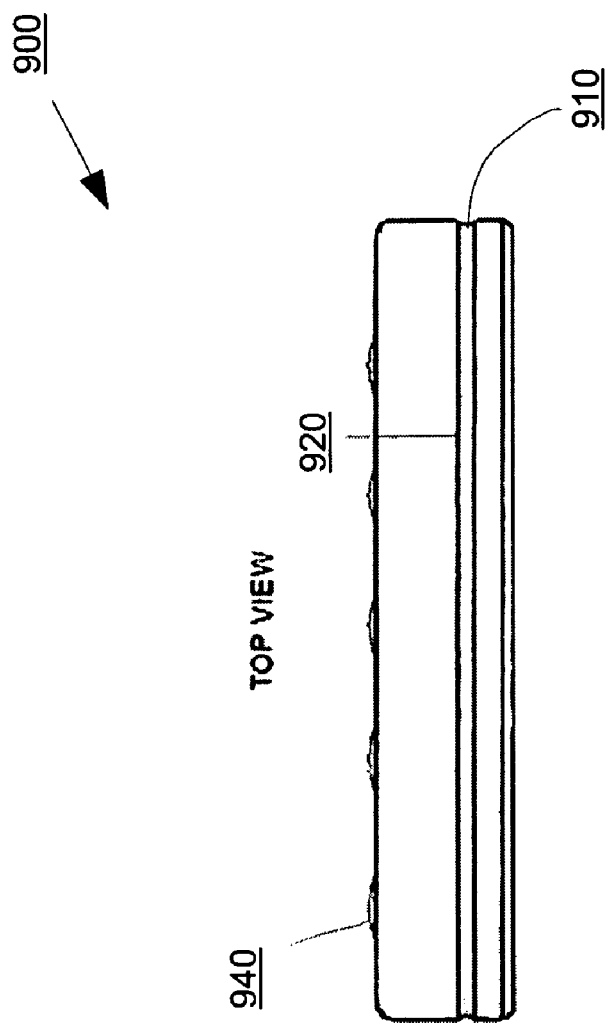
FIG. 9 is a top view of the foldable portable display illustrated in FIG. 7.

FIG. 9 is a top view of the foldable portable display illustrated in FIG. 7, arranged in accordance with the present disclosure. In some embodiments, FPD 900 may include buttons 940 that may extend outwards from the front face of FPD 900. The top of FPD may contain slot 910 from which the stored OLED may be extended. Slot 910 may have a sliding portal 920 that may be arranged to automatically seal the compartment (and/or case) of the FPD in which the OLED screen may be stored when fully retracted. Sliding portal 920 may be arranged to open to allow the stored OLED screen to be extended. When the OLED screen is fully extended, sliding portal 920 may be moved back to an intermediate position so as to seal slot 910 when the OLED screen is fully extended.

Figure 10:
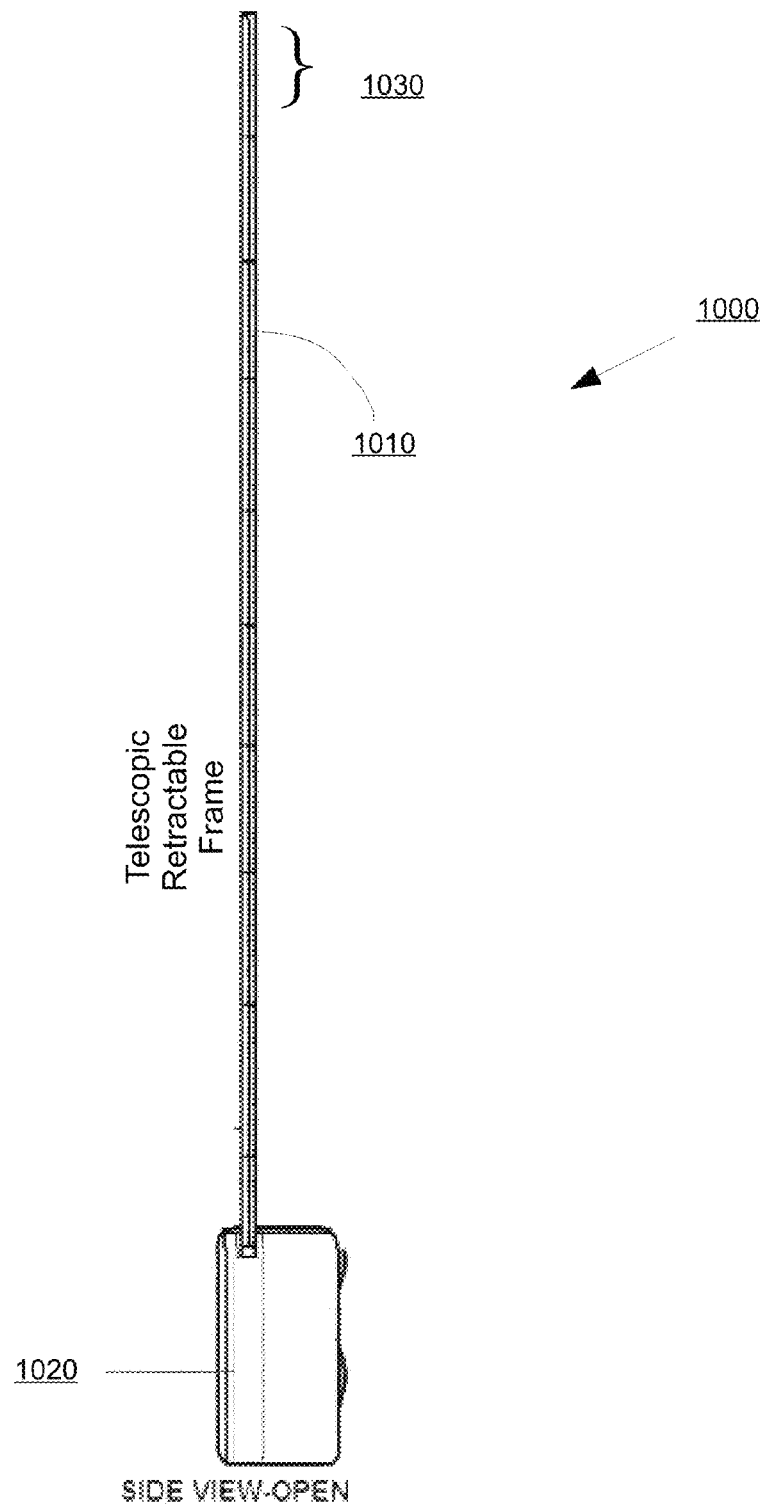
FIG. 10 is an side view of the foldable portable display illustrated in FIG. 7 in the opened position.

FIG. 10 is an side view of the foldable portable display illustrated in FIG. 7 in the opened position, arranged in accordance with the present disclosure. FPD 1000 is illustrated showing OLED screen 1010 in an extended position. FPD 1000 may include a compartment 1020 that may be arranged to store OLED screen 1010 when the screen is in a retracted position. In some embodiments, OLED screen 1010 may include vertical segments 1030 that telescope upwards and downwards so that OLED screen 1010 may be retracted into compartment 1020. Vertical segments 1030 of OLED screen 1010 may be made using a flexible titanium alloy, which may provide rigidity for suitably deploying the OLED screen and yet may also protect against breakage by bending when excess force is applied to the frame of OLED screen 1010.

Figure 11:
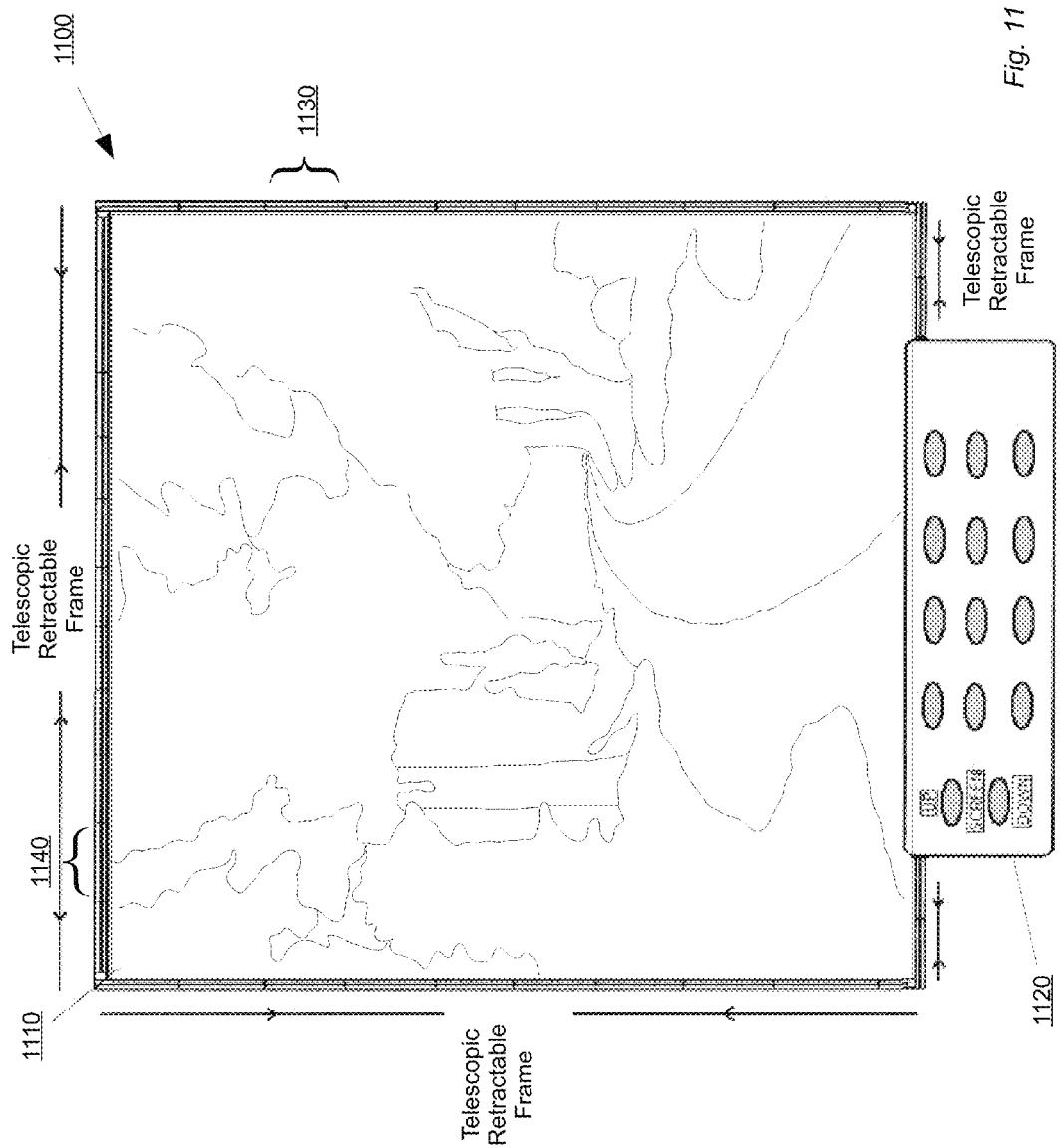
FIG. 11 is a front view of the foldable portable display illustrated in FIG. 7 in the opened position.

FIG. 11 is a front view of the foldable portable display illustrated in FIG. 7 in the opened position, arranged in accordance with the present disclosure. OLED screen 1110 is shown as being fully extended from case 1120 of FPD 1100. In some embodiments, OLED screen 1110 may include a foldable sheet of plastic OLEDs formed on a substrate (such as shown in FIG. 1). As illustrated in FIG. 11, the OLEDs may be formed as a matrix of solid state semiconductors such that an image may be displayed on OLED screen 1110. The substrate may be formed using highly flexible plastics and/or metallic foils.

As illustrated, OLED screen 1110 may be extended over six inches, in this example, in a vertical direction by extracting the (for example) folded or rolled substrate containing the OLEDs. OLED screen 1110 may include vertical segments 1130 along the left and right edges of OLED screen 1110. Vertical segments 1130 may be arranged to telescope upwards and downwards so that OLED screen 1110 may be retracted into a compartment of case 1120.

Case 1120 may have a width that is less than OLED screen 1110. OLED screen 1110 may include horizontal segments 1140 along the top and bottom edges of OLED screen 1110. The horizontal segments 1140 may be arranged to telescope laterally so that OLED screen 1110 may be extended across a span that is wider than case 1120. Thus OLED screen 1110 may be stored inside case 1120 even though OLED screen 1110 may be wider than case 1120.

Figure 12:
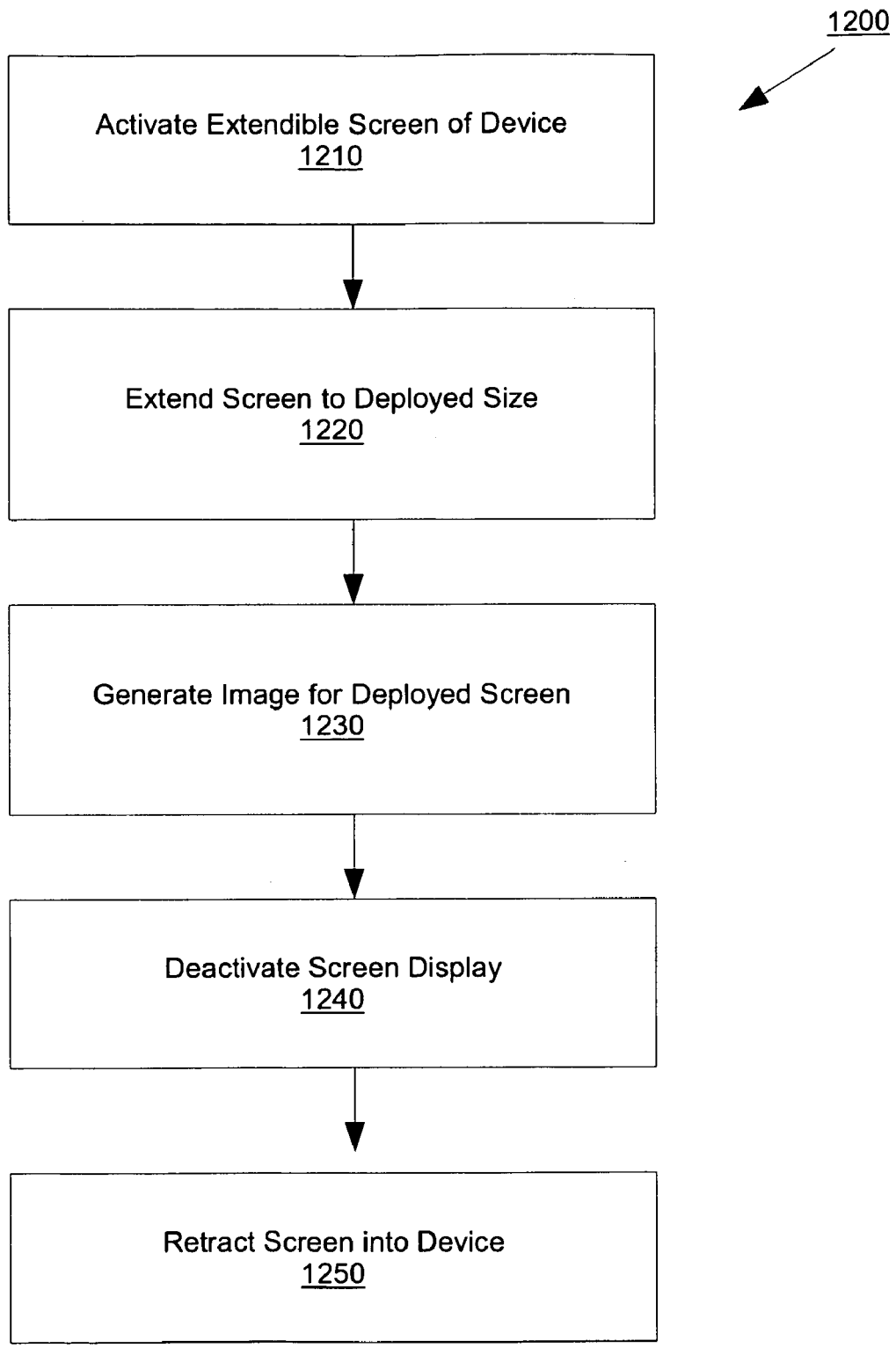
FIG. 12 is an operational flow diagram generally illustrating a process for deploying an extendible screen.

FIG. 12 is an operational flow diagram generally illustrating a process for deploying an extendible screen arranged in accordance with the present disclosure. The process 1200 may include one or more functions or process operations illustrated as blocks 1210, 1220, 1230, 1240 and/or 1250. At block 1210, a command to activate an extendible display of the computer device may be received by the computer device. The received command may be generated as a physical command such as a user activating a physical button or a virtual key on a touch screen of the computer device. The received command may also be generated in conjunction with the users' speaking into the microphone coupled to a voice recognition module. The received command may also be received from a remote controller such as an IR controller.

At block 1220, the computer device may generate commands to extend a screen of the extendible display to a deployed size in response to the command received in operation 1210. The deployed size may be greater than the size of the case of the computer device in which the extendible screen is stored. The extendible display may be extended from the computer device along a first direction to a length that is greater than the corresponding length of the computer device in the first direction. For example, the deployed size of extendible display can be taller than the height of a case of the computer device.

The extendible display may be extended from the computer device along a second direction that is orthogonal to the first direction. For example, the deployed size of the extendible display can be wider than the width of the case of the computer device.

The generated commands to extend the screen of the extendible display are executed to extend the display. Execution of commands may include actuating motors, solenoids, hydraulic and/or pneumatic valves, spring-loaded latches, and the like to accomplish unfolding or telescoping of a frame of the extendible display.

At block 1230, the computer device may generate an image for display on the deployed screen. Generating the image may include formatting images (including video) for display on the deployed screen. Generating the image may also include generating signals that are suitable for driving OLEDs of the deployed screen.

At block 1240, a command may be received by the computer device to deactivate the extendible display of the computer device. The received command may be generated as a physical command such as a user activating a physical button or a virtual key on a touch screen of the computer device. The received command can also be generated remotely.

At block 1250, the computer device may generate commands to retract the deployed extendible display in response to the command received in operation 1240. The deployed extendible display may be retracted into a compartment (such as a cavity or groove) of the case of the computer device. The generated commands may be executed to actuate motors, solenoids, hydraulic and/or pneumatic valves, spring-loaded latches, and the like to accomplish the retraction of the extendible display. Retraction of the extendible display may include unfolding and/or telescoping of segments of OLED frame of the extendible display.

Figure 13:
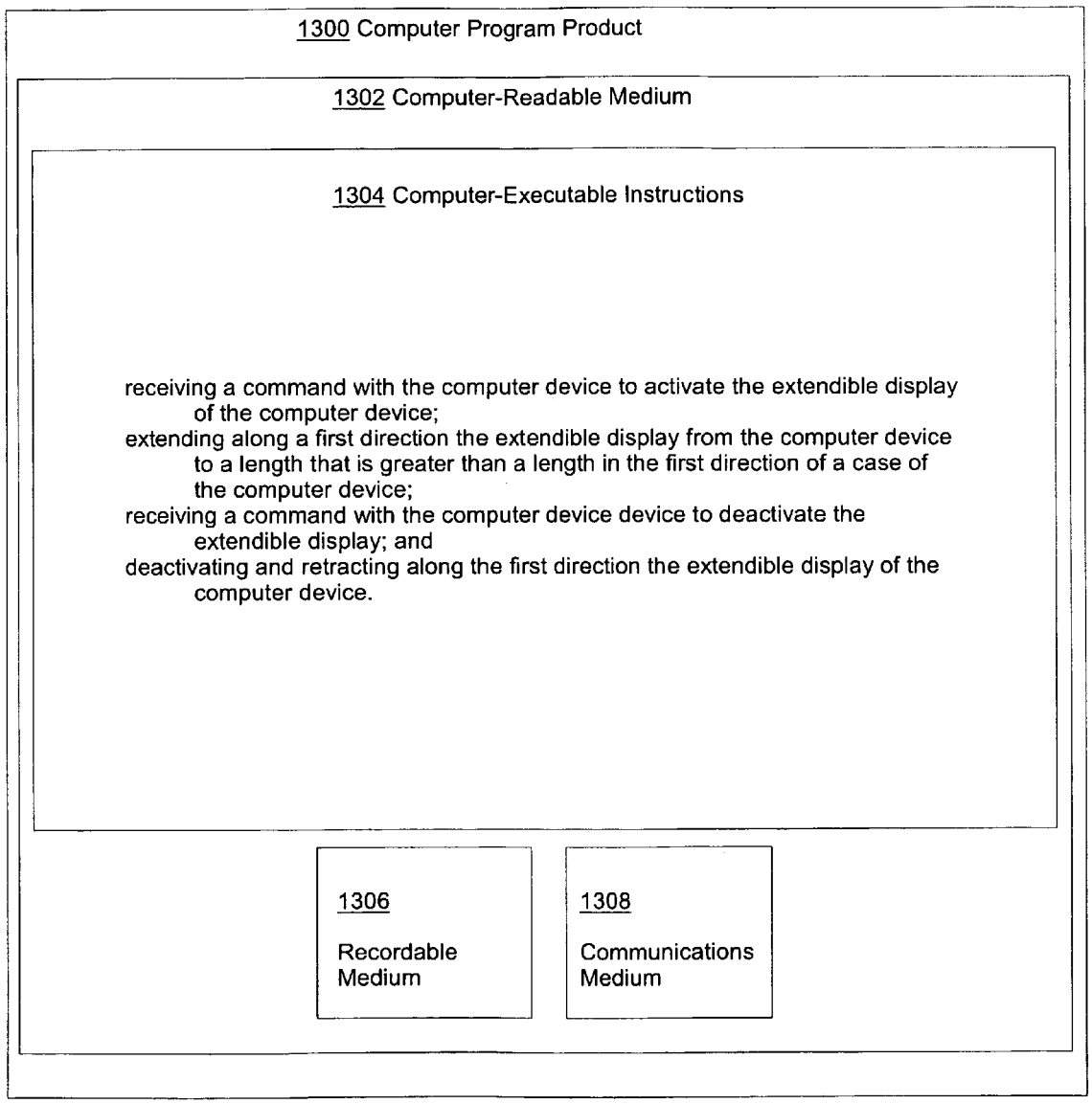
FIG. 13 is a diagram generally illustrating a computer product configured to deploy the extendible screen shown in FIG. 1.

FIG. 13 is a diagram generally illustrating a computer product configured to deploy the extendible screen shown in FIG. 1, arranged in accordance with the present disclosure. The computer program product 1300 may take one of several forms, such as a computer-readable medium 1302 having computer-executable instructions 1304, a recordable medium 1306, a communications medium 1308, or the like. When the computer-executable instructions 1304 are executed, a method is performed. The instructions 1304 include, among others, receiving a command with the computer device to activate the extendible display of the computer device, extending from the computer device along a first direction the extendible display to a length that is greater than a length in the first direction of a case of the computer device, receiving a command with the computer device to deactivate the extendible display, and deactivating and retracting along the first direction the extendible display of the computer device.

As will be appreciated in light of the present disclosure, the system and method described herein affords distinct advantages not previously available to users of display devices. The present systems and methods may allow users to use a relatively large form factor display as compared to the relatively small form factor used to store the display. For instance, the screen may be taller than the height of the case used to store the display.

In another aspect, in some embodiments of the presently described systems and methods for an extendible display, the display may extend in a second direction, which may result in an even relatively larger form factor display as compared to the relatively small form factor used to store the display. For instance, the screen can be taller and wider than the height and width of the case used to store the display.

Figure 14:
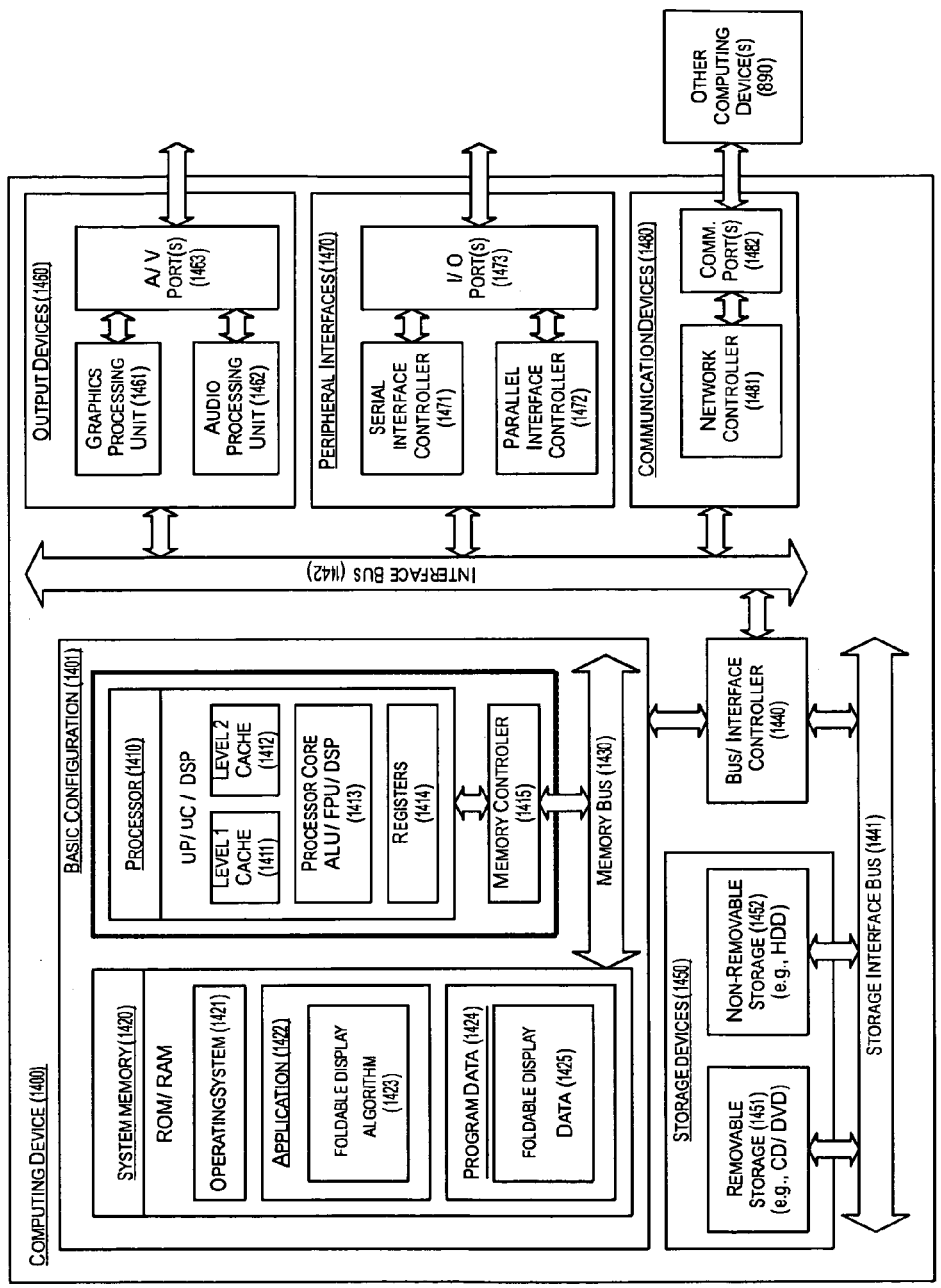
FIG. 14 is a block diagram illustrating an example computing device 1400 that is arranged for deploying a foldable display; all arranged in accordance with at least some embodiments of the present disclosure.
Figure 12:
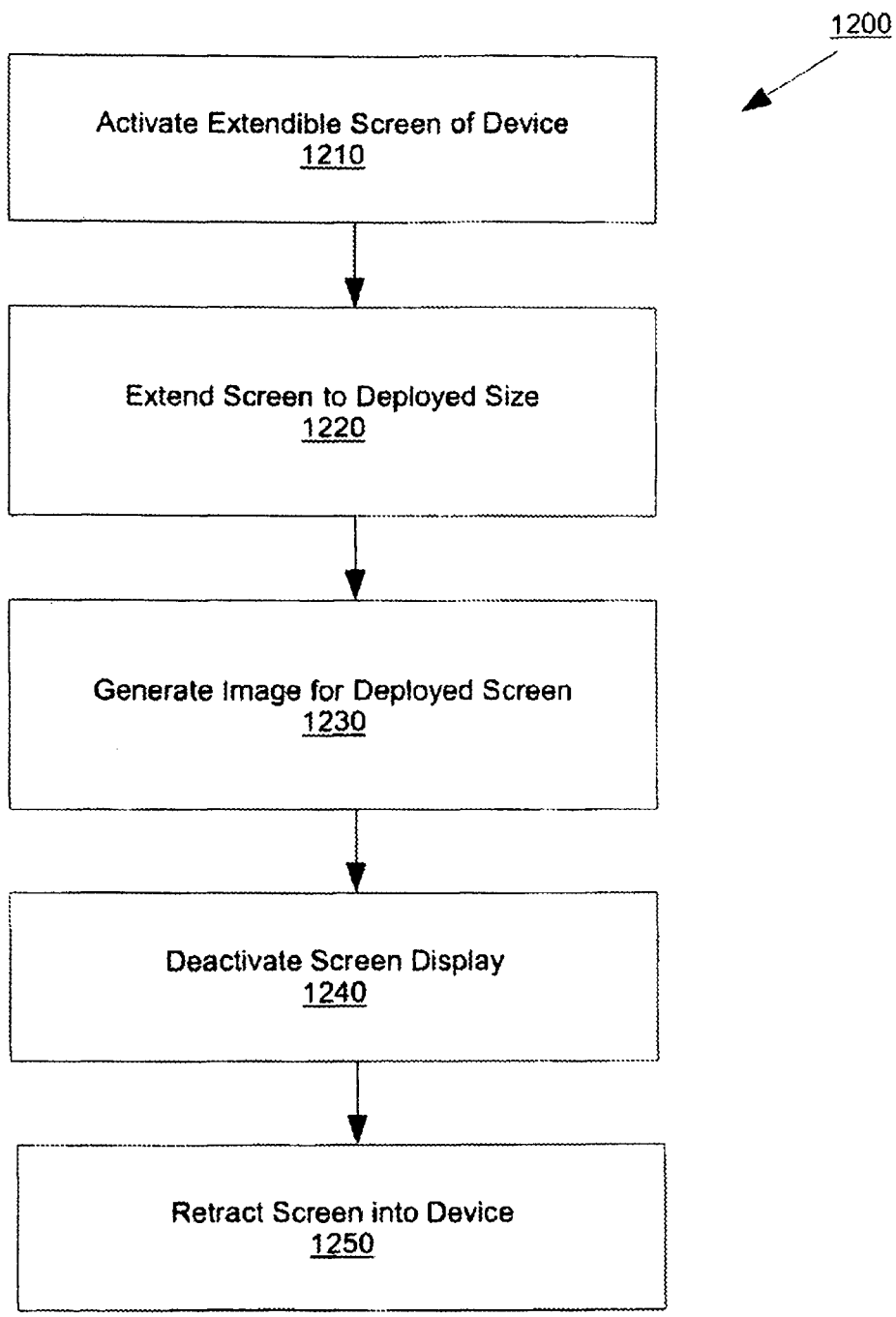
Figure 13:
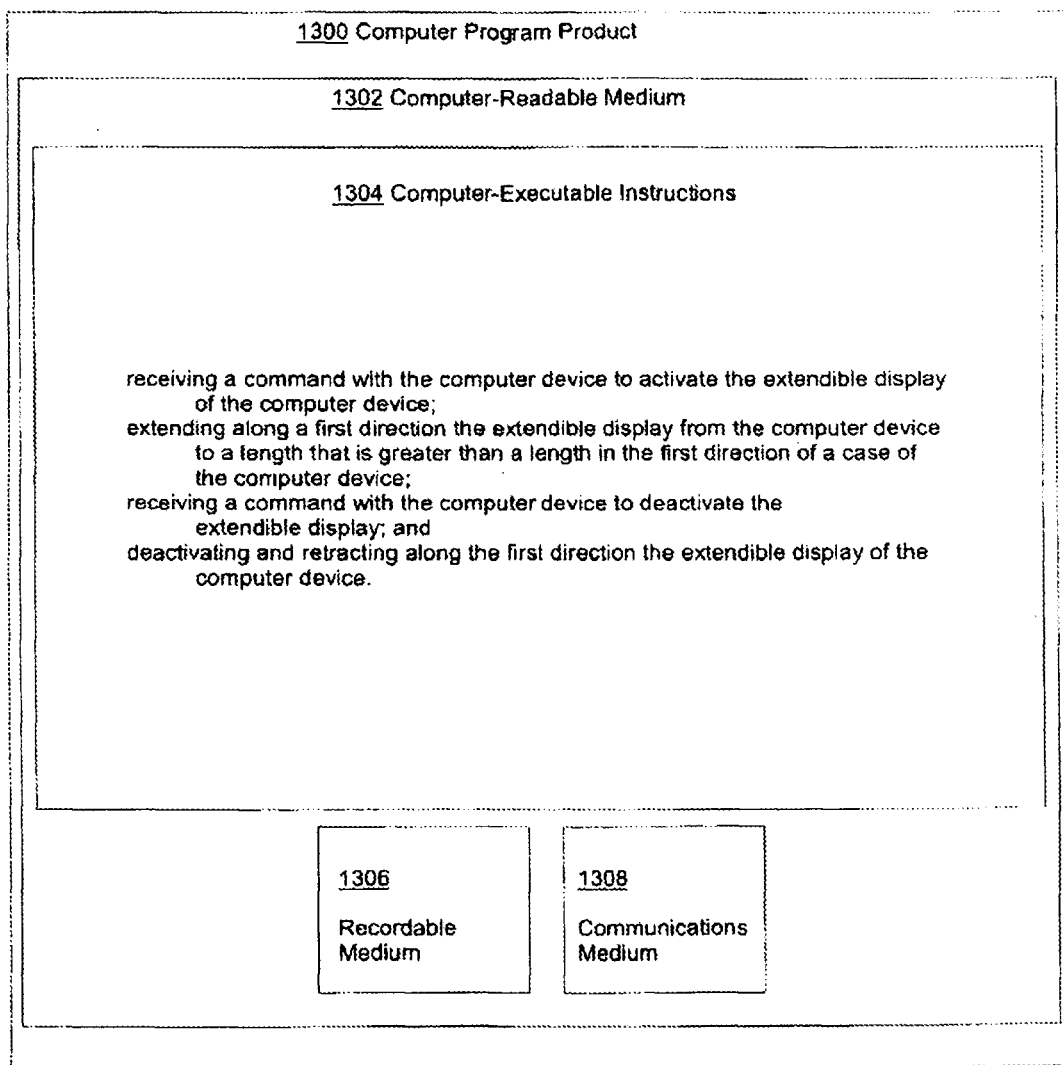
Figure 14:
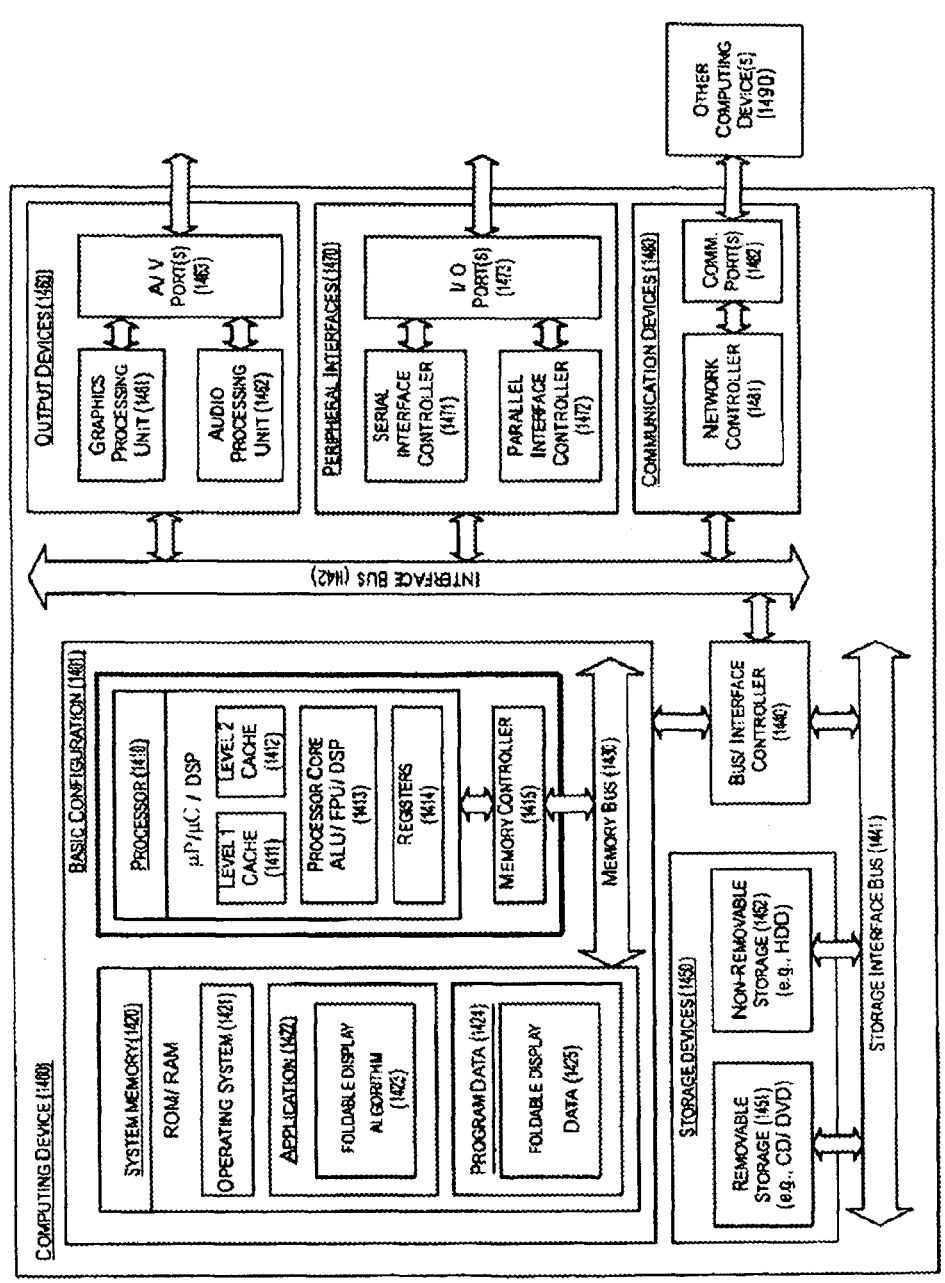

FIG. 14 is a block diagram illustrating an example computing device 1400 that is arranged for deploying a foldable display, in accordance with the present disclosure. In a very basic configuration 1401, computing device 1400 typically includes one or more processors 1410 and system memory 1420. A memory bus 1430 can be used for communicating between the processor 1410 and the system memory 1420.

Depending on the desired configuration, processor 1410 can be of any type including but not limited to a microprocessor (μP), a microcontroller (μC), a digital signal processor (DSP), or any combination thereof. Processor 1410 can include one more levels of caching, such as a level one cache 1411 and a level two cache 1412, a processor core 1413, and registers 1414. The processor core 1413 can include an arithmetic logic unit (ALU), a floating point unit (FPU), a digital signal processing core (DSP Core), or any combination thereof. A memory controller 1415 can also be used with the processor 1410, or in some implementations the memory controller 1415 can be an internal part of the processor 1410.

Depending on the desired configuration, the system memory 1420 can be of any type including but not limited to volatile memory (such as RAM), non-volatile memory (such as ROM, flash memory, etc.) or any combination thereof. System memory 1420 typically includes an operating system 1421, one or more applications 1422, and program data 1424. Application 1422 may include a foldable display algorithm 1423 that is arranged to control a foldable display. Program Data 1424 may include foldable display data 1425 that is useful for operating a foldable display as has been further described above. In some embodiments, application 1422 can be arranged to operate with program data 1424 on an operating system 1421 such that operation of a foldable display may be facilitated on general purpose computers. This described basic configuration is illustrated in FIG. 14 by those components within line 1401.

Computing device 1400 can have additional features or functionality, and additional interfaces to facilitate communications between the basic configuration 1401 and any required devices and interfaces. For example, a bus/interface controller 1440 can be used to facilitate communications between the basic configuration 1401 and one or more data storage devices 1450 via a storage interface bus 1441. The data storage devices 1450 can be removable storage devices 1451, non-removable storage devices 1452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1420, removable storage 1451 and non-removable storage 1452 are all examples of computer storage media. Computer storage media (or computer readable medium) includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1400. Any such computer storage media can be part of device 1400.

Computing device 1400 can also include an interface bus 1442 for facilitating communication from various interface devices (e.g., output interfaces, peripheral interfaces, and communication interfaces) to the basic configuration 1401 via the bus/interface controller 1440. Example output devices 1460 include a graphics processing unit 1461 and an audio processing unit 1462, which can be configured to communicate to various external devices such as a display or speakers via one or more A/V ports 1463. Example peripheral interfaces 1470 include a serial interface controller 1471 or a parallel interface controller 1472, which can be configured to communicate with external devices such as input devices (e.g., keyboard, mouse, pen, voice input device, touch input device, etc.) or other peripheral devices (e.g., printer, scanner, etc.) via one or more I/O ports 1473. An example communication device 1480 includes a network controller 1481, which can be arranged to facilitate communications with one or more other computing devices 1490 over a network communication via one or more communication ports 1482. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1400 can be implemented as a portion of a small-form factor portable (or mobile) computer such as a cell phone, a personal data assistant (PDA), a personal media player device, a wireless web-watch device, a personal headset device, an application specific device, or a hybrid device that include any of the above functions. Computing device 1400 can also be implemented as a personal computer including both laptop computer and non-laptop computer configurations.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments have been disclosed herein, other aspects and embodiments will be apparent to those skilled in art. The various sports and embodiments disclosed herein are for purposes of illustration and are not intended to be limiting, with the true scope and spirit being indicated by the following claims.

What is claimed is:

1. A computer-implemented method for a computer device to deploy an extendible display, the method comprising:
   receiving a first command with the computer device to activate the extendible display of the computer device;
   in response to the first command, extending from an inside of the computer device the extendible display along a first direction so that the extendible display extends to a length that is greater than a length in the first direction of a case of the computer device;
   in response to the first command, telescoping or unfolding two or more segments of a frame of the extendible display, wherein the two or more segments telescope or unfold from the inside of the computer device along the first direction and from the case of the computer device;
   receiving a second command with the computer device to deactivate the extendible display; and
   in response to the second command, deactivating and retracting the extendible display along the first direction of the computer device.

2. The method recited in claim 1, further comprising generating an image to display on at least a portion of the extendible display, wherein a length along the first direction of the displayed image is greater than the length of the case in the first direction of the computer device.

3. The method recited in claim 1, wherein the extendible display comprises a screen of a matrix of organic light emitting diodes (OLEDs), wherein the matrix is configured to display the displayed image.

4. The method recited in claim 1, further comprising, in response to the first command, extending the frame along a second direction, wherein the second direction is orthogonal to the first direction.

5. The method recited in claim 1, further comprising, in response to the first command, telescoping segments of the frame of the extendible display, wherein segments oriented along the first dimension telescope along the first direction from the case of the computer device, and wherein segments oriented along a second direction that is orthogonal to the first direction telescope along the second direction.

6. The method recited in claim 1, wherein the first command to activate the extendible display of the computer device is received using voice recognition.

7. The method recited in claim 1, wherein the commands to activate and deactivate the extendible display of the computer device are received using a touch sensitive screen that includes OLEDs arranged to display a displayed image.

8. The method recited in claim 1, wherein the first command to activate the extendible display of the computer device is received using a touch sensitive screen.

9. A computer readable medium encoded with computer-executable instructions for a computer device to control deploying an extendible display, the instructions comprising:
   receiving a first command with the computer device to activate the extendible display of the computer device;
   in response to the first command, extending along a first direction the extendible display from an inside of the computer device so that the extendible display extends to a length that is greater than a length in the first direction of a case of the computer device;
   in response to the first command, telescoping or unfolding two or more segments of a frame of the extendible display, wherein the two or more segments telescope or unfold from the inside of the computer device along the first direction and from the case of the computer device;
   generating an image to display on at least a portion of the extendible display, wherein a length along the first direction of the displayed image is greater than the length of the case in the first direction of the computer device;
   receiving a second command with the computer device to deactivate the extendible display; and
   in response to the second command, deactivating and retracting along the first direction the extendible display of the computer device.

10. The computer readable medium recited in claim 9, wherein the instructions for displaying the image comprise instructions for driving a matrix of organic light emitting diodes (OLEDs) that is configured to display the displayed image.

11. The computer readable medium recited in claim 9, further comprising instructions to extend the extendible display to a width that is wider than the case of the extendible display.

12. The computer readable medium recited in claim 9, further comprising voice recognition instructions to receive the command to activate the extendible display of the computer device.

13. The computer readable medium recited in claim 9, further comprising instructions to receive the command to activate the extendible display of the computer device from a touch sensitive screen.

14. The computer readable medium recited in claim 9, wherein the instructions for displaying the displayed image include instructions for playing or and/or recording multimedia content.

15. A system effective to deploy an extendible display, the system comprising:
   a computing device having a case; and
   an extendible display, wherein the extendible display is configurable to be stored within the case of the computing device, wherein the computing device is configured to execute instructions effective to:
      receive a first command with the computer device to activate the extendible display of the computer device;
      in response to the first command, extend along a first direction the extendible display from an inside of the computer device so that the extendable display extends to a length that is greater than a length in the first direction of a case of the computer device;

in response to the first command, telescope or unfold two or more segments of a frame of the extendible display, wherein the two or more segments telescope or unfold from the inside of the computer device along the first direction and from the case of the computer device;

receive a second command with the computer device to deactivate the extendible display; and in response to the second command, deactivate and retract along the first direction the extendible display of the computer device.

16. The system recited in claim 15, wherein the computing device is further configured to execute instructions effective to generate an image to display on at least a portion of the extendible display, wherein a length along the first direction of the displayed image is greater than the length of the case in the first direction of the computer device.

17. The system recited in claim 15, wherein the extendible display comprises a frame that comprises titanium alloy rails.

18. A computer device, comprising:
a case adapted for storage, the case having a first length in a first direction; and an extendible display having a frame including two or more segments, and a second length in the first direction, wherein the extendible display and segments of the frame are configured for storage in the case of the computing device, wherein the extendible display is further configured to extend along the first direction to a second length that is greater than the first length, wherein the segments of the frame are configured to telescope or unfold from the case along the first direction, and wherein the extendible display and segments of the frame are is further configured to retract along the first direction into the case for storage.

19. The computer device recited in claim 18, wherein the extendible display is configured to extend in response to a command asserted by the computer device.

20. The computer device recited in claim 18, wherein the extendible display is configured to extend in response to a user manipulating the extendible display.

21. The computer device recited in claim 18, wherein the extendible display is configured to extend in response to both a command asserted by the computer device and a user manipulating the extendible display.

22. The computer device recited in claim 21, wherein the command is asserted by the computer device while the user is manipulating the extendible display.

* * * * *

UNITED STATES PATENT AND TRADEMARK OFFICE
CERTIFICATE OF CORRECTION

PATENT NO. : 8,378,932 B2
APPLICATION NO. : 12/463969
DATED : February 19, 2013
INVENTOR(S) : Fein et al.

It is certified that error appears in the above-identified patent and that said Letters Patent is hereby corrected as shown below:

In the Drawings:

In Fig. 12, Sheet 12 of 14, delete " 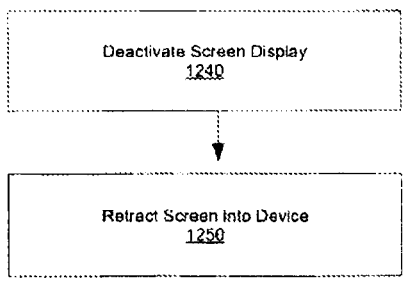 " and insert -- 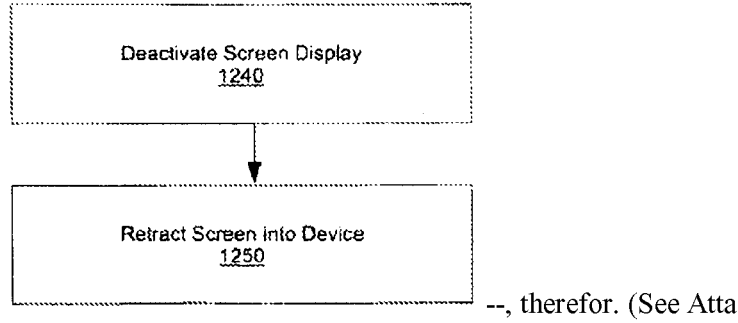 --, therefor. (See Attached Sheet)

In Fig. 13, Sheet 13 of 14, in Box "(1304)", in Line 6, delete "device device" and insert -- device --, therefor. (See Attached Sheet)

In Fig. 14, Sheet 14 of 14, below "PROCESSOR (1410)" delete "UP/UC / DSP" and insert -- µP/µC/DSP --, therefor. (See Attached Sheet)

In Fig. 14, Sheet 14 of 14, in Box "(1421)", in Line 1, delete "OPERATTNGSYSTEM" and insert -- OPERATING SYSTEM --, therefor.

In Fig. 14, Sheet 14 of 14, in Box "(1415)", in Line 1, delete "CONTROLER" and insert -- CONTROLLER --, therefor.

Signed and Sealed this
Fifteenth Day of October, 2013

Teresa Stanek Rea
*Deputy Director of the United States Patent and Trademark Office*

In Fig. 14, Sheet 14 of 14, in Box "(1480)", Line 1, delete "COMMUNICATIONDEVICES" and insert -- COMMUNICATION DEVICES --, therefor.

In Fig. 14, Sheet 14 of 14, delete " 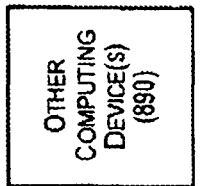 " and insert --  --, therefor.

In the Specifications:

In Column 1, Line 41, delete "is an" and insert -- is a --, therefor.

In Column 7, Line 60, delete "(HDD)," and insert -- (HDDs), --, therefor.

In Column 7, Line 62, delete "(SSD)," and insert -- (SSDs), --, therefor.

In Column 8, Line 6, delete "(DVD)" and insert -- (DVDs), --, therefor.

In the Claims:

In Column 14, Line 11, in Claim 18, delete "are is" and insert -- are --, therefor.